US012143860B1

(12) United States Patent
Kwok et al.

(10) Patent No.: US 12,143,860 B1
(45) Date of Patent: Nov. 12, 2024

(54) INTELLIGENT ACCESS TRAFFIC STEERING, SWITCHING, AND SPLITTING (ATSSS)

(71) Applicant: T-Mobile USA, Inc., Bellevue, WA (US)

(72) Inventors: Ming Shan Kwok, Seattle, WA (US); Hsin Fu Henry Chiang, Bellevue, WA (US); Wafik Abdel Shahid, Kenmore, WA (US); Boris Antsev, Bothell, WA (US); Suresh Thanneeru, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 172 days.

(21) Appl. No.: 17/210,376

(22) Filed: Mar. 23, 2021

(51) Int. Cl.
*H04W 28/08* (2023.01)
*H04W 24/02* (2009.01)
*H04W 24/08* (2009.01)
*H04W 28/02* (2009.01)
*H04W 88/16* (2009.01)

(52) U.S. Cl.
CPC ....... *H04W 28/0967* (2020.05); *H04W 24/02* (2013.01); *H04W 24/08* (2013.01); *H04W 28/0268* (2013.01); *H04W 28/0933* (2020.05); *H04W 88/16* (2013.01)

(58) Field of Classification Search
CPC .. H04W 88/16; H04W 28/0268; H04W 24/08
See application file for complete search history.

(56) References Cited

U.S. PATENT DOCUMENTS

| 10,728,817 | B1* | 7/2020 | Kaki | H04W 76/22 |
| 10,834,626 | B2* | 11/2020 | Youn | H04W 28/24 |
| 2005/0185632 | A1* | 8/2005 | Draves | H04L 45/02 370/351 |
| 2014/0086081 | A1* | 3/2014 | Mack | H04W 16/14 370/252 |
| 2015/0319629 | A1* | 11/2015 | Dabirmoghaddam | H04W 28/04 370/252 |

(Continued)

FOREIGN PATENT DOCUMENTS

WO  WO-2020038132 A1 *  2/2020  ............. H04L 47/14

OTHER PUBLICATIONS

3GPP TS 23.501 V16.7.0 (Dec. 2020) (Year: 2020).*

*Primary Examiner* — Andre Tacdiran
(74) *Attorney, Agent, or Firm* — Foley IP Law, PLLC

(57) ABSTRACT

Solutions for access traffic steering, switching, and splitting (ATSSS) include: receiving, from a user equipment (UE), channel performance information for: a first channel passing from the UE, through a radio access network (RAN) and a packet routing node, to an external remote node, a second channel passing from the UE, through a local wireless node, a routing node, and the packet routing node, to the external remote node, and a third channel passing from the UE, through the local wireless node and an external computer network, to the external remote node; based on at least the channel performance information, selecting an initial channel from among the first channel, the second channel, and the third channel; and instructing the UE to steer a protocol data unit (PDU) session between the UE and the external remote node to at least the initial channel.

17 Claims, 8 Drawing Sheets

(56) References Cited

U.S. PATENT DOCUMENTS

| | | | |
|---|---|---|---|
| 2016/0065446 A1* | 3/2016 | Li | H04L 45/121 |
| | | | 370/352 |
| 2020/0229035 A1* | 7/2020 | Kim | H04W 76/11 |
| 2020/0245383 A1* | 7/2020 | Lu | H04W 76/12 |
| 2022/0116327 A1* | 4/2022 | Salkintzis | H04W 28/0215 |
| 2022/0124542 A1* | 4/2022 | Li | H04W 88/085 |
| 2022/0210848 A1* | 6/2022 | Suh | H04W 4/90 |
| 2022/0322132 A1* | 10/2022 | Kim | H04W 4/48 |

\* cited by examiner

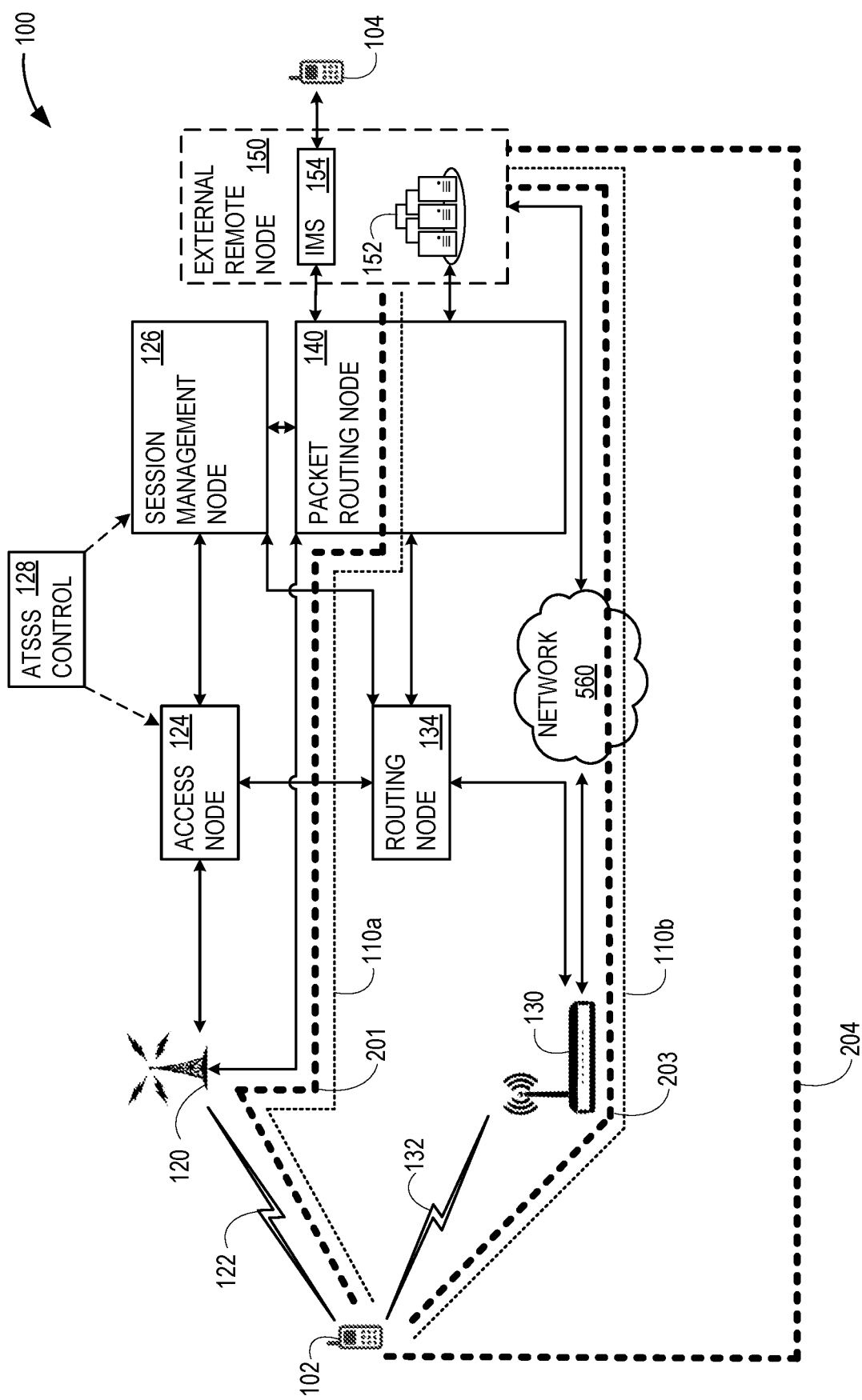

INTELLIGENT ACCESS TRAFFIC STEERING, SWITCHING, AND SPLITTING (ATSSS)

BACKGROUND

Access traffic steering switching and splitting (ATSSS) is a network capability, implemented by some cellular networks, to manage multiple accesses channels for load balancing and/or to improve UE data traffic speed. For example, a cellular network may instruct a user equipment (UE) to use either the cellular radio access network (RAN) for a protocol data unit (PDU) session (e.g., downloading data, uploading data, streaming video, voice calls, etc.) or to use a WiFi router, and enter the cellular network as managed WiFi data traffic. This provides two different paths between the UE and a packet routing node (e.g., a user plane function (UPF) or a packet data network gateway (PGW) user plane (PGW-U)). However, using either path, the cellular network's packet routing node still carries the PDU session traffic.

SUMMARY

The following summary is provided to illustrate examples disclosed herein, but is not meant to limit all examples to any particular configuration or sequence of operations.

Solutions for access traffic steering, switching, and splitting (ATSSS) include: receiving, from a user equipment (UE), channel performance information for: a first channel passing from the UE, through a radio access network (RAN) and a packet routing node, to an external remote node, a second channel passing from the UE, through a local wireless node, a routing node, and the packet routing node, to the external remote node, and a third channel passing from the UE, through the local wireless node and an external computer network, to the external remote node: based on at least the channel performance information, selecting an initial channel from among the first channel, the second channel, and the third channel; and instructing the UE to steer a protocol data unit (PDU) session between the UE and the external remote node to at least the initial channel.

Aspects of the disclosure may be applicable to at least fifth generation (5G) cellular networks and fourth generation (4G) cellular networks. In some examples, the channel performance information comprises at least one quality parameter such as availability, round trip time (RTT), bandwidth, and error rate. In some examples, the external remote node comprises a data network (DN); or the external remote node comprises an internet protocol (IP) multimedia subsystem (IMS) and the PDU session comprises a voice over long term evolution (VOLTE) call or a voice over new radio (VoNR) call. In some examples, the local wireless node comprises a WiFi router. In some examples, the packet routing node comprises a user plane function (UPF) and the routing node comprises an N3 interworking function (N3IWF); or the packet routing node comprises a packet data network gateway (PGW) user plane (PGW-U) and the routing node comprises an evolved packet data gateway (ePDG). In some examples, the node controlling this ATSSS functionality (e.g., an ATSSS control node) comprises an access and mobility management function (AMF), a mobility management entity (MME), a session management function (SMF), or a PGW control plane (PGW-C). In some examples, the external computer network comprises the internet.

BRIEF DESCRIPTION OF THE DRAWINGS

The disclosed examples are described below with reference to the accompanying drawing figures listed below, wherein:

FIG. 2D illustrates a PDU session split to using both the first and third channels in the arrangement of FIG. 1;

Figure 1:
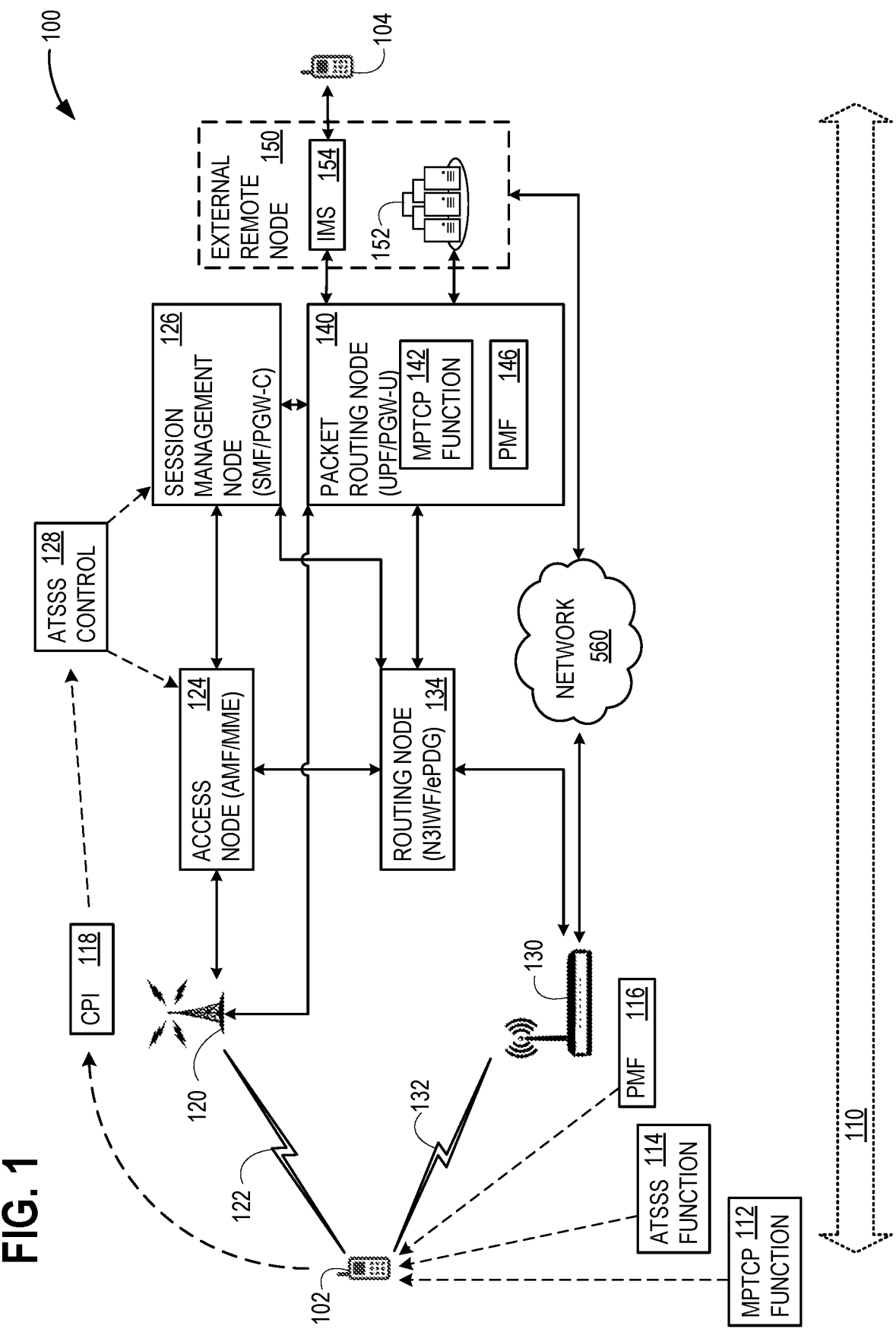
FIG. 1 illustrates an exemplary arrangement that advantageously employs improved access traffic steering, switching, and splitting (ATSSS) for a protocol data unit (PDU) session.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for access traffic steering, switching, and splitting (ATSSS) include: receiving, from a user equipment (UE), channel performance information for: a first channel passing from the UE, through a radio access network (RAN) and a packet routing node, to an external remote node, a second channel passing from the UE, through a local wireless node, a routing node, and the packet routing node, to the external remote node, and a third channel passing from the UE, through the local wireless node and an external computer network, to the external remote node: based on at least the channel performance information, selecting an initial channel from among the first channel, the second channel, and the third channel; and instructing the UE to steer a protocol data unit (PDU) session between the UE and the external remote node to at least the initial channel. The third channel bypasses the cellular network's packet routing node, providing additional load balancing options.

Aspects of the disclosure may be applicable to at least fifth generation (5G) cellular networks and fourth generation (4G) cellular networks. In some examples, the channel performance information comprises at least one quality parameter such as availability, round trip time (RTT), bandwidth, and error rate. In some examples, the external remote node comprises a data network (DN); or the external remote node comprises an internet protocol (IP) multimedia subsystem (IMS) and the PDU session comprises a voice over long term evolution (VOLTE) call or a voice over new radio (VoNR) call. In some examples, the local wireless node comprises a WiFi router. In some examples, the packet routing node comprises a user plane function (UPF) and the routing node comprises an N3 interworking function (N3IWF); or the packet routing node comprises a packet data network gateway (PGW) user plane (PGW-U) and the routing node comprises an evolved packet data gateway (ePDG). In some examples, the node controlling this ATSSS functionality (e.g., an ATSSS control node) comprises an access and mobility management function (AMF), a mobility management entity (MME), a session management function (SMF), or a PGW control plane (PGW-C). In some examples, the external computer network comprises the internet.

Some examples further include, based on at least a change in the channel performance information, selecting a new channel from among the first channel, the second channel, and the third channel; and instructing the UE to switch the PDU session from the initial channel to the new channel. Some examples further include, collecting, by the UE, the channel performance information by conducting performance measurements for each of the first channel, the second channel, and the third channel. Some examples further include, monitoring for a change in the channel performance information; based on at least a change in the channel performance information, selecting an additional channel from among the first channel, the second channel, and the third channel; and instructing the UE to split the PDU session between the initial channel and the additional channel.

Aspects of the disclosure improve the speed of data traffic by selecting a channel based on at least the channel performance information that may include round trip time (RTT) and/or bandwidth. In some scenarios, RTT indicates channel latency. In some examples, the channel with the lowest latency or the highest bandwidth is selected. Aspects of the disclosure improve the reliability of data traffic by selecting a channel based on at least the channel performance information that may include availability and/or error rate. In some examples, the available channel with the lowest error rate is selected. Aspects of the disclosure operate in an unconventional manner by including a non-cellular channel as an ATSSS option. This increases the number of ATSSS channels from two to at least three (or more).

FIG. 1 illustrates an exemplary arrangement 100 that advantageously employs improved ATSSS for a PDU session 110 between a UE 102 and an external remote node 150. UE 102 uses PDU session 110 to upload or download data, or stream audio or video from a data network 152 or have a voice call with a second UE 104. The voice call may be a VOLTE call (in 4G) or a VoNR call (in 5G). Voice calls pass through an IMS 154 to reach UE 104. Data network 152 and IMS 154 are each (or collectively) identified generically as external remote node 150. Arrangement 100 provides multiple paths between UE 102 and external remote node 150, which are highlighted and described in further detail in relation to FIGS. 2A-2C, as channels 201, 202, and 203.

Arrangement 100 includes a RAN 120, which communicates with UE 102 over an air interface 122. RAN 120 communicates with an access node 124, which communicates with a session management node 126 for managing connectivity and routing aspects of PDU session 110. In some examples, such as 5G, access node 124 comprises an AMF and session management node 126 comprises an SMF. In some examples, such as 4G, access node 124 comprises an MME and session management node 126 comprises a PGW-C.

Arrangement 100 also includes a local wireless node 130, which communicates with UE 102 over an air interface 132. Local wireless node 130 communicates an external computer network 560 and a routing node 134. In some examples, local wireless node 130 communicates with routing node 134 through a portion of external computer network 560. In some examples, local wireless node 130 comprises a WiFi router, and external computer network 560 comprises the internet. External computer network 560 is described in additional detail in relation to FIG. 5. In some examples, routing node 134 comprises an N3IWF (for 5G) or an ePDG (for 4G).

Both RAN 120 and routing node 134 communicate with packet routing node 140, which communicates with external remote node 150. External computer network 560 also communicates with external remote node 150 without needing to pass traffic through routing node 134. In some examples, WiFi traffic (from UE 102, through local wireless node 130) that passes through routing node 134 is labeled as "managed WiFi" because the traffic is managed by a cellular network carrier through at least a portion of a cellular network (e.g., routing node 134 and packet routing node 140), whereas WiFi traffic (from UE 102, through local wireless node 130) that passes to external remote node 150 without also passing through routing node 134 and packet routing node 140 is labeled as "unmanaged WiFi."

ATSSS functionality is controlled in arrangement 100 by an ATSSS control node 128, which may be within access node 124 and/or session management node 126. That is, access node 124 may act as ATSSS control node 128, session management node 126 may act as ATSSS control node 128, or access node 124 and session management node 126 may function together to act as ATSSS control node 128. ATSSS control node 128 selects the channel or channels to use for PDU session 110, such as assigning an initial channel, switching PDU session 110 to a new (different) channel when channel conditions warrant a change, and/or splitting PDU session 110 among multiple (a plurality) of channels.

In order to accomplish this management task, ATSSS control node 128 receives data, such as channel performance information 118, from at least UE 102, and instructs UE 104 which channel(s) to use. UE 102 has a multipath transmission control protocol (MPTCP) function 112 that enables UE 102 to use split PDU session 110 among multiple channels, for example dividing outgoing data among two or more channels and re-assembling incoming data from two or more channels. UE 102 also has an ATSSS function 114 that communicates with ATSSS control node 128 to receive the channel usage instructions and report channel information to ATSSS control node 128. UE 102 also has a performance management function (PMF) 116 that measures channel performance information 118, such as availability, RTT, bandwidth, and error rate, which is forwarded by ATSSS function 114 to ATSSS control node 128 as the channel information. Packet routing node 140 also has an MPTCP function 142 and a PMF 146 that provide similar functionality within packet routing node 140 as MPTCP function 112 and PMF 116 provide for UE 102.

Figure 2A:
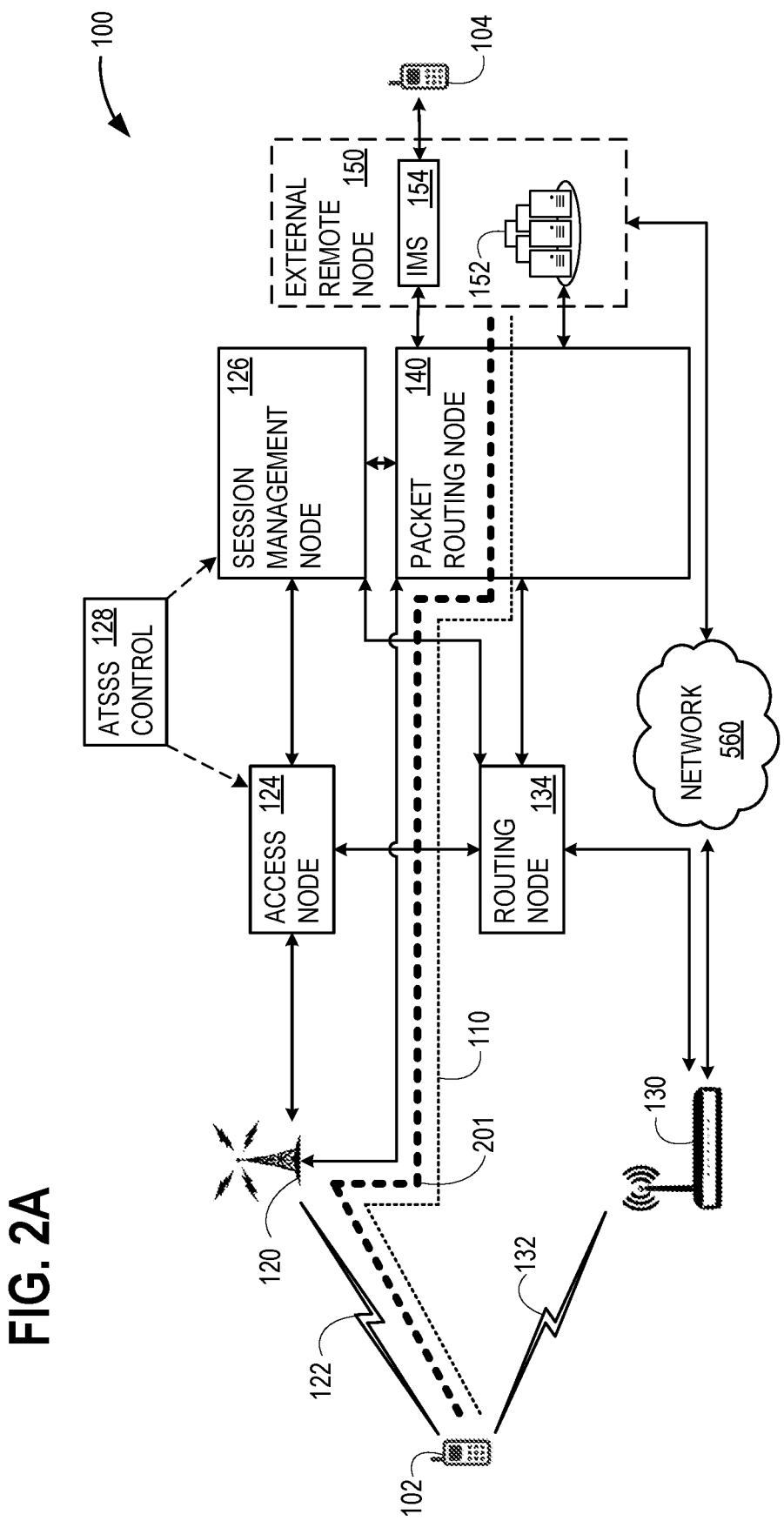
FIG. 2A illustrates a PDU session using a first channel in the arrangement of FIG. 1.
Figure 2B:
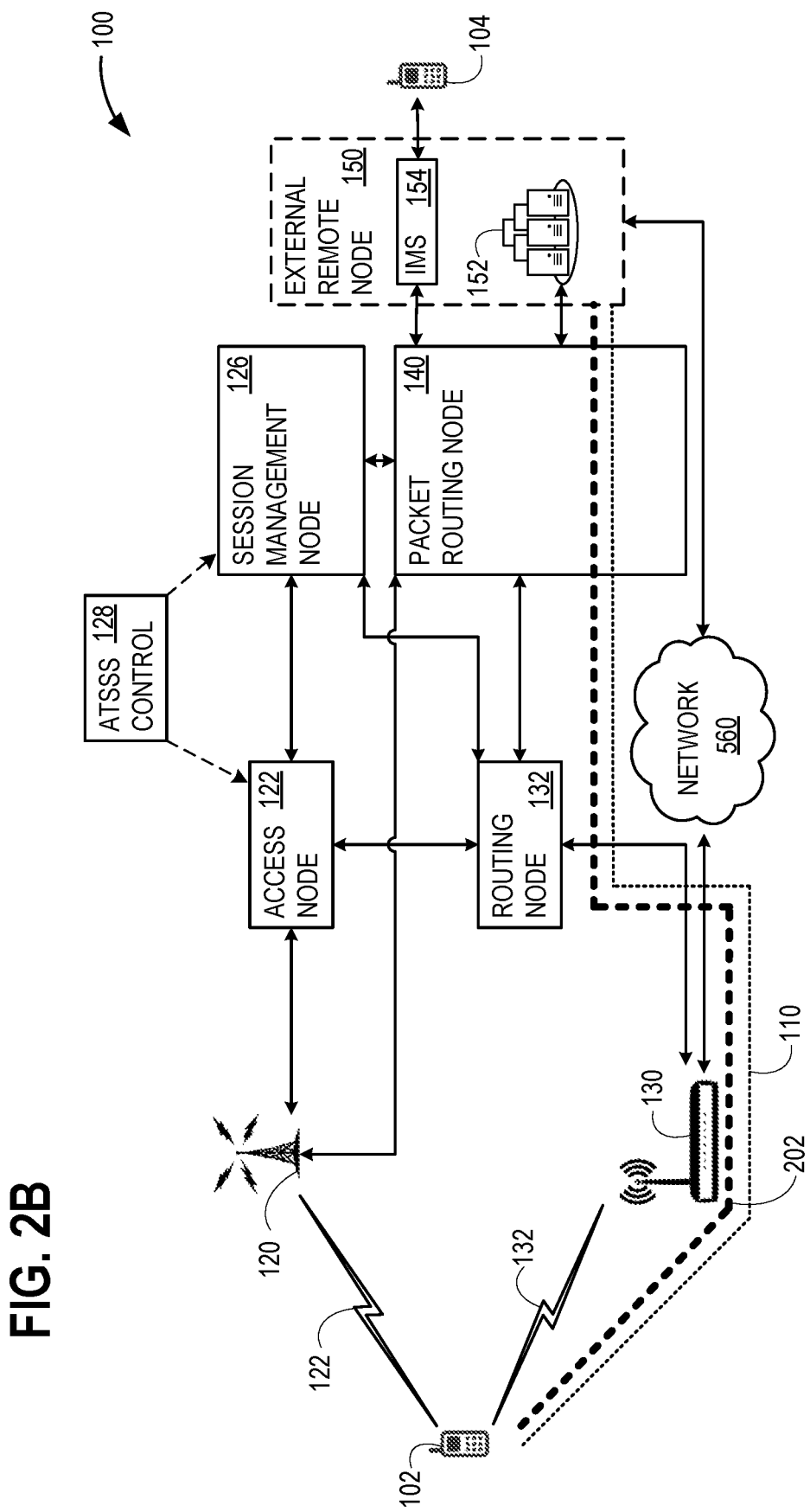
FIG. 2B illustrates a PDU session using a second channel in the arrangement of FIG. 1.
Figure 2C:
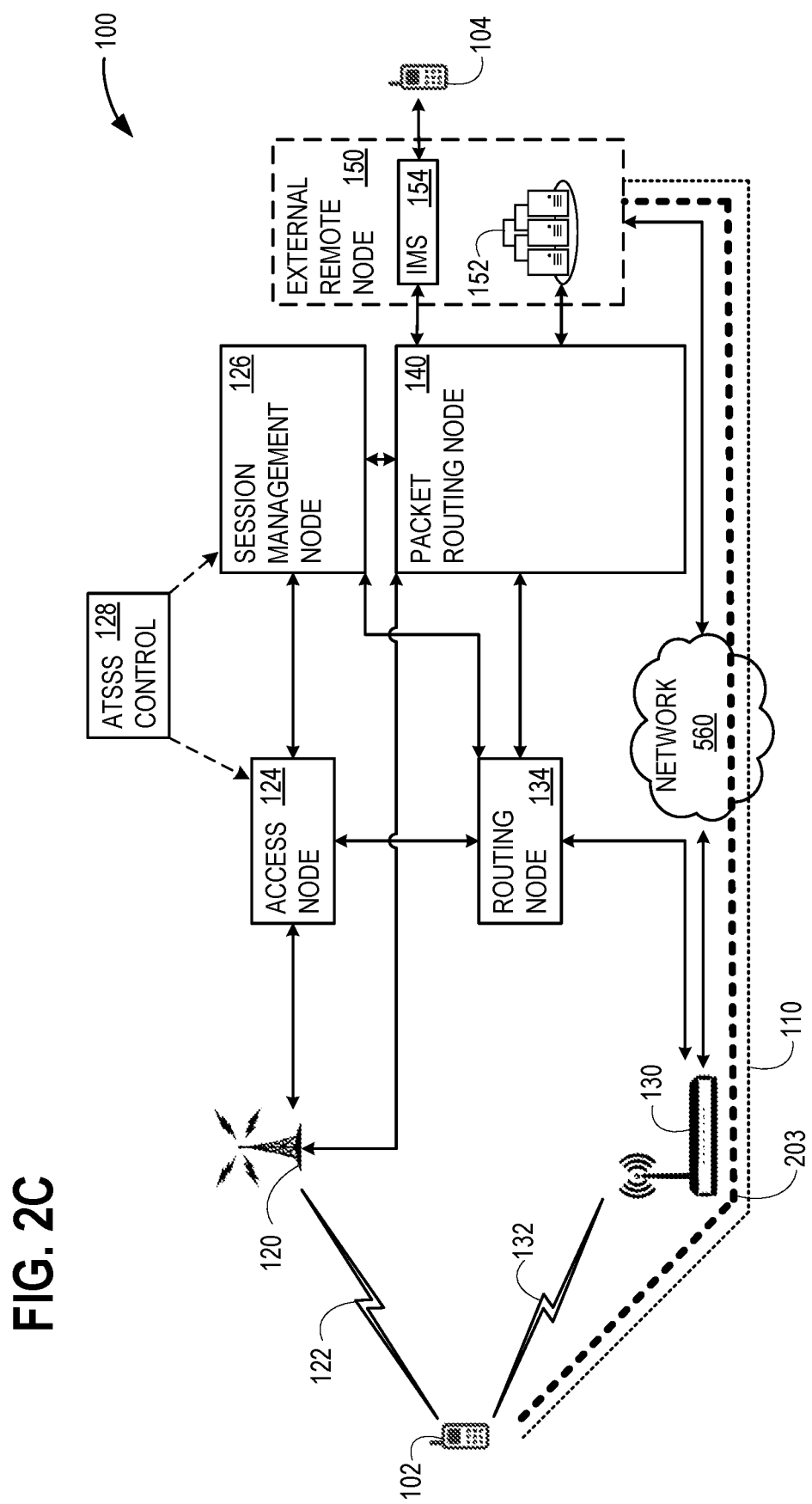
FIG. 2C illustrates a PDU session using a third channel in the arrangement of FIG. 1.

FIG. 2A illustrates PDU session 110 using channel 201 in arrangement 100. Channel 201 passes from UE 102, over air interface 122, through RAN 120, and through packet routing node 140, to external remote node 150. FIG. 2B illustrates PDU session 110 using channel 202 in arrangement 100. Channel 202 passes from UE 102, over air interface 132, through local wireless node 130, through routing node 134, and through packet routing node 140, to external remote node 150. In some examples, channel 202 also passes through external computer network 560 between local wireless node 130 and routing node 134. FIG. 2C illustrates PDU session 110 using channel 203 in arrangement 100. Channel 203 passes from UE 102, over air interface 132, through local wireless node 130, and through external computer network 560, to external remote node 150, bypassing packet routing node 140.

FIG. 2D illustrates PDU session 110 as split into PDU session component 110a and PDU session component 110b, and using both channel 201 and channel 203. As illustrated, PDU session component 110a uses channel 201 and PDU session component 110b uses channel 203. A general fourth path (fourth channel) may be identified as a pathway between UE 102 and external remote node 150 that passes through external computer network 560. In some examples, the fourth channel 204 also passes through local wireless node 130, as a parallel path with channel 203, although UE 102 may reach external computer network 560 another way with fourth channel 204 (e.g., a peer-to-peer network using Bluetooth™). In some examples, the improved ATSSS also uses fourth channel 204.

Figure 3:
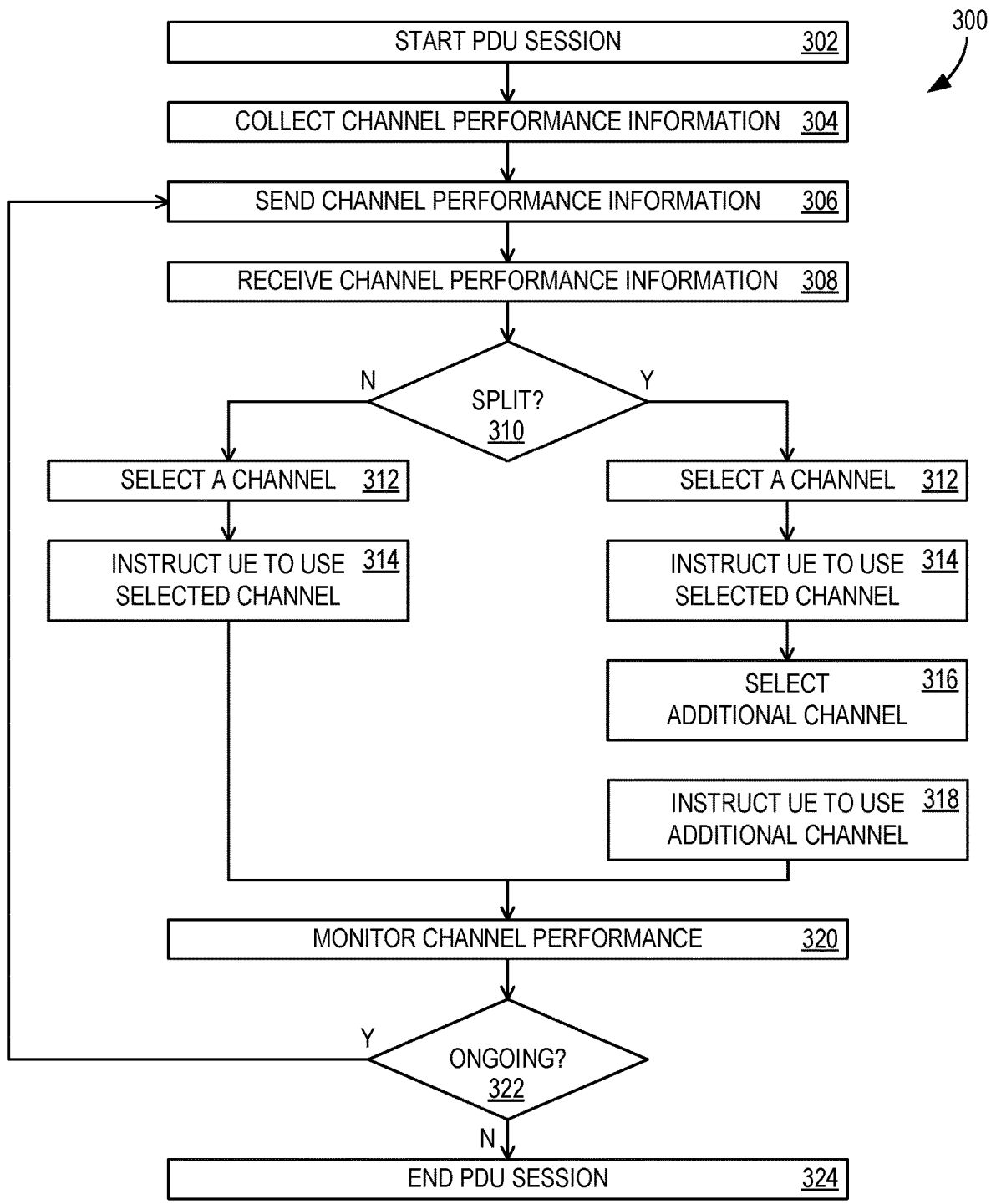
FIG. 3 illustrates a flowchart of exemplary operations that may be associated with examples of the arrangement of FIG. 1

FIG. 3 illustrates a flowchart 300 of exemplary operations that may be associated with examples of arrangement 100. That is, flowchart 300 identifies exemplary operations associated with improved ATSSS. In some examples, at least a portion of flowchart 300 may each be performed using one or more computing devices 500 of FIG. 5. Operation 302 marks the start of PDU session 110, which may be with a session initiation protocol (SIP) request message. Operation 304 includes collecting, by UE 104, channel performance information 118 by conducting performance measurements (with PMF 116) for each of channel 201, channel 202, and channel 203. In some examples, operation 304 also includes collecting, by UE 104, channel performance information 118 for channel 204. In some examples, channel performance information 118 comprises at least one quality parameter selected from the list consisting of: availability, RTT, bandwidth, and error rate. In some examples, UE 102 sends channel performance information 118 through RAN 120 (a similar path as cellular traffic) or through routing node 134 (a similar path as managed WiFi). In some examples, operations 302 and 304 occur in parallel, or in a reversed order.

Operation 306 includes sending by UE 102, channel performance information 118 to ATSSS control node 128. In some examples, ATSSS control node 128 comprises access node 124 and/or session management node 126. In some examples, access node 124 comprises an AMF or an MME. In some examples, session management node 126 comprises an SMF or a PGW-C. Operation 308 includes receiving (e.g., by ATSSS control node 128), from UE 102, channel performance information 118 for channel 201 passing from UE 102, through RAN 120 and packet routing node 140, to external remote node 150, channel 202 passing from UE 102, through local wireless node 130, routing node 134, and packet routing node 140, to external remote node 150, and channel 203 passing from UE 102, through local wireless node 130 and external computer network 560, to external remote node 150. In some examples, channel performance information 118 for channel 204 is also included.

A decision operation 310 determines whether UE 102 will use a single channel for PDU session 110 or instead use multiple channels. If a single channel is to be used, operation 312 includes, based on at least channel performance information 118, selecting an initial channel from among channel 201, channel 202, and channel 203 (and channel 204, in some examples). In some examples, the channel with the lowest latency or the highest bandwidth is selected. In some examples, the available channel with the lowest error rate is selected. Operation 314 includes instructing UE 102 to steer PDU session 110 between UE 102 and external remote node 150 to at least the initial channel. ATSSS control node 128 may perform operations 310-314. These scenarios are shown in FIGS. 2A-2C.

If, however, multiple channels are to be used, as shown in the scenario of FIG. 2D, operations 312 and 314 are performed for one of the channels, but operations 316 and 318 are performed for the additional channel. Operation 316 includes, based on at least a change in channel performance information 118, selecting an additional channel from among channel 201, channel 202, and channel 203 (and channel 204, in some examples). Operation 318 includes instructing UE 102 to split PDU session 110 between the initial channel and the additional channel. In some examples, duplicates of operations 316 and 318 may be used for yet another additional channel. ATSSS control node 128 may perform operations 316 and 318.

With PDU session 110 thus established, operation 320 includes monitoring for a change in channel performance information 118. This may occur based on a time interval, or upon a trigger condition noted by UE 102 or ATSSS control node 128, such as a drop in channel performance (e.g., increase in error rate, loss of data, etc.). A decision operation 322 determines whether PDU session 110 is ongoing or has finished. UE 102 may either be the cause of terminating PDU session 110 (e.g., the user hanging up a phone call or redirecting a website browser on UE 102), or may be informed that PDU session 110 is ending (e.g., UE 104 terminates a phone call). Session management node 126 and/or access node 124 will be alerted of a termination of PDU session 110, so ATSSS control node 128 may make this decision.

If PDU session 110 is ongoing, flowchart 300 returns to operation 306, for UE to send the new version of channel performance information 118. If the initial channel is performing badly, and another channel is performing well, a second pass through operation 312 includes, based on at least a change in channel performance information 118, selecting a new channel from among channel 201, channel 202, and channel 203 (and channel 204, in some examples). Some hysteresis prevention measures may be included, such as introducing a delay before a change, in order to prevent PDU session 110 from bouncing back-an forth between different channels. If a new channel is to be used, this second pass through operation 314 includes instructing UE 102 to switch PDU session 110 from the initial channel to the new channel. Otherwise, if PDU session 110 terminates, operation 324 ends PDU session 110 by release the channel(s).

Figure 4:
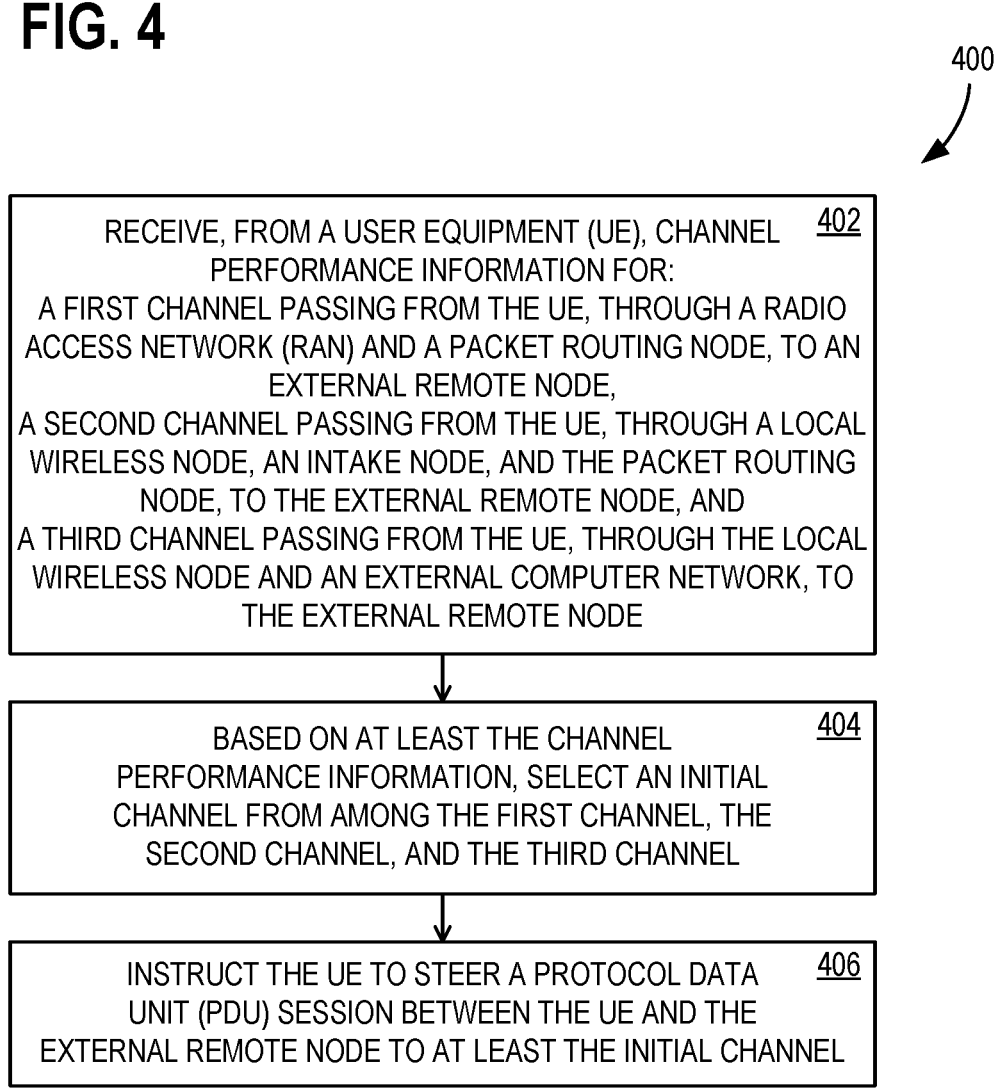
FIG. 4 illustrates another flowchart of exemplary operations that may be associated with examples of the arrangement of FIG. 1.

FIG. 4 illustrates a flowchart 400 of exemplary operations associated with improved ATSSS. In some examples, at least a portion of flowchart 400 may be performed using one or more computing devices 500 of FIG. 5. Operation 402 includes receiving, from a UE, channel performance information for: a first channel passing from the UE, through a RAN and a packet routing node, to an external remote node, a second channel passing from the UE, through a local wireless node, a routing node, and the packet routing node, to the external remote node, and a third channel passing from the UE, through the local wireless node and an external computer network, to the external remote node. Operation 404 includes, based on at least the channel performance information, selecting an initial channel from among the first channel, the second channel, and the third channel. Operation 406 includes instructing the UE to steer a PDU session between the UE and the external remote node to at least the initial channel.

Figure 5:
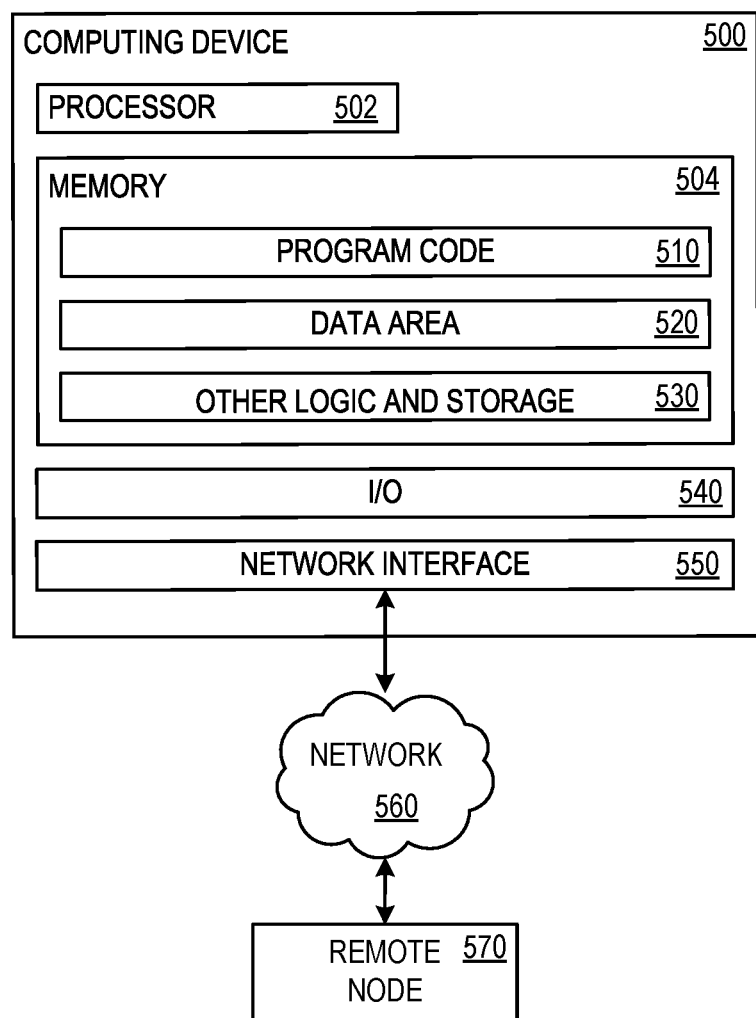
FIG. 5 illustrates a block diagram of a computing device suitable for implementing various aspects of the disclosure.

FIG. 5 illustrates a block diagram of computing device 500 that may be used as a component of arrangement 100, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over external computer network 560 with a remote node 570, which may represent another implementation of computing device 500.

ADDITIONAL EXAMPLES

An example method of ATSSS comprises: receiving, from a UE, channel performance information for: a first channel passing from the UE, through a RAN and a packet routing node, to an external remote node, a second channel passing from the UE, through a local wireless node, a routing node, and the packet routing node, to the external remote node, and a third channel passing from the UE, through the local wireless node and an external computer network, to the external remote node; based on at least the channel performance information, selecting an initial channel from among the first channel, the second channel, and the third channel; and instructing the UE to steer a PDU session between the UE and the external remote node to at least the initial channel.

An example system for ATSSS comprises: a processor; and a computer-readable medium storing instructions that are operative upon execution by the processor to: receive, from a user equipment (UE), channel performance information for: a first channel passing from the UE, through a radio access network (RAN) and a packet routing node, to an external remote node, a second channel passing from the UE, through a local wireless node, a routing node, and the packet routing node, to the external remote node, and a third channel passing from the UE, through the local wireless node and an external computer network, to the external remote node; based on at least the channel performance information, select an initial channel from among the first channel, the second channel, and the third channel; and instruct the UE to steer a protocol data unit (PDU) session between the UE and the external remote node to at least the initial channel.

One or more example computer storage devices has computer-executable instructions stored thereon, which, upon execution by a computer, cause the computer to perform operations comprising: receiving, from a user equipment (UE), channel performance information for: a first channel passing from the UE, through a radio access network (RAN) and a packet routing node, to an external remote node, a second channel passing from the UE, through a local wireless node, a routing node, and the packet routing node, to the external remote node, and a third channel passing from the UE, through the local wireless node and an external computer network, to the external remote node; based on at least the channel performance information, selecting an initial channel from among the first channel, the second channel, and the third channel; and instructing the UE to steer a protocol data unit (PDU) session between the UE and the external remote node to at least the initial channel.

Alternatively, or in addition to the other examples described herein, examples include any combination of the following;
    the channel performance information comprises at least one quality parameter selected from the list consisting of: availability, RTT, bandwidth, and error rate;
    the external remote node comprises a DN;
    the external remote node comprises an IMS;
    the PDU session comprises a VOLTE call;
    the PDU session comprises a VoNR call;
    the local wireless node comprises a WiFi router;
    based on at least a change in the channel performance information, selecting a new channel from among the first channel, the second channel, and the third channel;
    instructing the UE to switch the PDU session from the initial channel to the new channel;
    the packet routing node comprises a UPF;
    the routing node comprises an N3IWF;
    the packet routing node comprises a PGW-U;
    the routing node comprises an ePDG;
    collecting, by the UE, the channel performance information by conducting performance measurements for each of the first channel, the second channel, and the third channel;
    receiving, from the UE, the channel performance information comprises receiving, at an ATSSS control node, from the UE, the channel performance information;
    selecting the initial channel comprises selecting, by the ATSSS control node, the initial channel;
    instructing the UE comprises instructing, by the ATSSS control node, the UE;
    the ATSSS control node comprises an access node;
    the access node comprises an AMF;
    the access node comprises an MME;
    the ATSSS control node comprises a session management node;
    the session management node comprises an SMF;
    the session management node comprises a PGW-C;
    monitoring for a change in the channel performance information;
    based on at least a change in the channel performance information, selecting an additional channel from among the first channel, the second channel, and the third channel;
    instructing the UE to split the PDU session between the initial channel and the additional channel; and
    the external computer network comprises the internet.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of access traffic steering, switching, and splitting (ATSSS), the method comprising:
   receiving, from a user equipment (UE), channel performance information for:
      a first channel passing from the UE, through a radio access network (RAN) and a packet routing node, to an external remote node,
      a second channel passing from the UE, through a local wireless node, a routing node, and the packet routing node, to the external remote node, and
      a third channel that bypasses the packet routing node by passing from the UE, through the local wireless node and an external computer network, to the external remote node, wherein the channel performance information includes at least a round trip time (RTT) for the first channel, an RTT for the second channel, and an RTT for the third channel;
   selecting the third channel as an initial channel based on the RTT for the third channel being less than each of the RTT for the first channel and the RTT for the second channel; and
   instructing the UE to steer a protocol data unit (PDU) session between the UE and the external remote node to at least the selected third channel.

2. The method of claim 1, wherein:
   the external remote node comprises a data network (DN); or
   the external remote node comprises an internet protocol (IP) multimedia subsystem (IMS) and the PDU session comprises a voice over long term evolution (VOLTE) call or a voice over new radio (VoNR) call.

3. The method of claim 1, wherein:
   the packet routing node comprises a user plane function (UPF) and the routing node comprises an N3 interworking function (N3IWF); or
   the packet routing node comprises a packet data network gateway (PGW) user plane (PGW-U) and the routing node comprises an evolved packet data gateway (ePDG).

4. The method of claim 1, further comprising instructing the UE to split the PDU session between at least the selected third channel and an additional channel that is separate and distinct from the selected third channel.

5. The method of claim 4, wherein the additional channel includes the first channel passing through the RAN.

6. The method of claim 4, wherein the additional channel includes the second channel passing through the local wireless node and the packet routing node.

7. The method of claim 4, wherein the additional channel includes a fourth channel passing through a peer-to-peer network.

8. The method of claim 4, wherein the additional channel has a higher round trip time (RTT) than the selected third channel.

9. The method of claim 8, wherein the additional channel has a higher bandwidth than the selected third channel.

10. The method of claim 8, wherein the additional channel has a lower error rate than the selected third channel.

11. The method of claim 8, wherein the additional channel has a higher availability than the selected third channel.

12. A system for access traffic steering, switching, and splitting (ATSSS), the system comprising:
    a processor; and
    a computer-readable medium storing instructions that are operative upon execution by the processor to:
       receive, from a user equipment (UE), channel performance information for:
          a first channel passing from the UE, through a radio access network (RAN) and a packet routing node, to an external remote node,
          a second channel passing from the UE, through a local wireless node, a routing node, and the packet routing node, to the external remote node, and
          a third channel passing from the UE, through the local wireless node and an external computer network, to the external remote node, wherein the channel performance information includes a round trip time (RTT) for the first channel, an RTT for the second channel, and an RTT for the third channel;
       select the third channel as an initial channel based on the RTT for the third channel being less than each of the RTT for the first channel and the RTT for the second channel; and
       instruct the UE to steer a protocol data unit (PDU) session between the UE and the external remote node to the selected third channel.

13. The system of claim 12, wherein:
    the external remote node comprises a data network (DN); or
    the external remote node comprises an internet protocol (IP) multimedia subsystem (IMS) and the PDU session comprises a voice over long term evolution (VOLTE) call or a voice over new radio (VoNR) call.

14. The system of claim 12, wherein the local wireless node comprises a WiFi router.

15. One or more computer storage devices having computer-executable instructions stored thereon, which, upon execution by a computer, cause the computer to perform operations comprising:
    receiving, from a user equipment (UE), channel performance information for:
       a first channel passing from the UE, through a radio access network (RAN) and a packet routing node, to an external remote node,
       a second channel passing from the UE, through a local wireless node, a routing node, and the packet routing node, to the external remote node, and
       a third channel that bypasses the packet routing node by passing from the UE, through the local wireless node and an external computer network, to the external remote node, wherein the channel performance information includes at least a round trip time (RTT) for the first channel, an RTT for the second channel, and an RTT for the third channel;

selecting the third channel as an initial channel based on the RTT for the third channel being less than each of the RTT for the first channel and the RTT for the second channel; and instructing the UE to steer a protocol data unit (PDU) session between the UE and the external remote node to at least the selected third channel.

16. The one or more computer storage devices of claim 15, wherein:

the external remote node comprises a data network (DN); or the external remote node comprises an internet protocol (IP) multimedia subsystem (IMS) and the PDU session comprises a voice over long term evolution (VOLTE) call or a voice over new radio (VoNR) call.

17. The one or more computer storage devices of claim 15, wherein the local wireless node comprises a WiFi router, and wherein:

the packet routing node comprises a user plane function (UPF) and the routing node comprises an N3 interworking function (N3IWF); or the packet routing node comprises a packet data network gateway (PGW) user plane (PGW-U) and the routing node comprises an evolved packet data gateway (ePDG).

* * * * *